United States Patent [19]

Sakuma et al.

[11] Patent Number: 5,459,507
[45] Date of Patent: Oct. 17, 1995

[54] TERMINAL DEVICE FOR A CATV SYSTEM HAVING A READ OUT FUNCTION

[75] Inventors: Kazushi Sakuma; Masahiko Kawasaki; Takashi Nozaki, all of Tokyo, Japan

[73] Assignee: Pioneer Electronic Corp., Tokyo, Japan

[21] Appl. No.: 855,818

[22] Filed: Mar. 23, 1992

[30] Foreign Application Priority Data

Mar. 25, 1991 [JP] Japan .................................. 3-082880

[51] Int. Cl.$^6$ .................................................. H04N 7/10
[52] U.S. Cl. ............................ 348/10; 348/12; 455/5.1; 455/6.2
[58] Field of Search ................. 455/4.1, 4.2, 3.1, 455/6.1, 6.2; 358/86, 84, 183, 188; 348/6, 7, 8, 9, 10, 11, 12, 13, 552, 725, 730, 734, 553, 555, 563, 564, 569; 380/10, 21, 5; 340/825.34, 825.44, 825.52, 825.56; H04N 7/10, 7/16, 7/167, 5/44, 5/445, 5/46, 9/040

[56] References Cited

U.S. PATENT DOCUMENTS

| | | | |
|---|---|---|---|
| 4,760,597 | 7/1988 | Hayes | 380/10 |
| 4,792,972 | 12/1988 | Cook, Jr. | 455/4.2 |
| 4,926,264 | 5/1990 | Ohno et al. | 455/4.1 |
| 4,987,486 | 1/1991 | Johnson et al. | 348/10 |
| 5,093,921 | 3/1992 | Bevins, Jr. | 455/4.1 |

FOREIGN PATENT DOCUMENTS

| | | | |
|---|---|---|---|
| 0226587 | 12/1984 | Japan | 558/86 |
| 0058681 | 3/1991 | Japan | H04N 5/440 |

Primary Examiner—David E. Harvey
Attorney, Agent, or Firm—Nikaido, Marmelstein, Murray & Oram

[57] ABSTRACT

A terminal device for a CATV system is described which includes a microcomputer for controlling the operation of the terminal device. The type of module which is connected to an input/output port of the microcomputer is recognized by a recognizing element and information identifying the recognized kind of module is displayed on a display in response to a predetermined operation of a keyboard.

7 Claims, 8 Drawing Sheets

TERMINAL DEVICE FOR A CATV SYSTEM HAVING A READ OUT FUNCTION

BACKGROUND OF THE INVENTION

The present invention relates to a terminal device used in a community antenna television (CATV) system.

Each terminal device has an identification address. In a two-way transmission CATV system, a data command signal is transmitted from a center to terminal devices connected to respective television receivers of subscribers by polling. The polling is a method of calling the terminals in sequence from a center to allow each in turn to transmit information data on hand.

The center sends a command signal including an address data and a command data to every terminal and receives a response signal including response data such as data for imposing a license fee from every addressed terminal in sequence. The terminal sends the data by a proper method, for example by a frequency shift keying (FSK) signal. In this way, the channel which the subscriber watches is monitored, thereby enabling to supervise pay per view (PPV) system of television programs. If the terminal device is provided with a special function module for two-way data transmission, programs wherein the subscriber can participate, such as opinion polls and shopping by television, become possible.

The terminal device is lent to the subscriber and withdrawn therefrom when the contract is cancelled. The data on the license of the withdrawn terminal device is erased by the center. The withdrawn terminal device is further lent to a new subscriber. When the terminal device is installed in the subscriber's house, the function of the device, the receiving condition of the FSK signal, the erasure of the data on the license fee for the old subscriber, and other data are confirmed. The function must be known for various purposes such as setting, and repairing the device. The FSK signal must be exactly received by the terminal device for performing the polling.

These data are known by the version of a microcomputer mounted in the terminal device and/or the appearance of the device. However, there are many versions in the microcomputer, and in the circuit modules thereof. In addition, the terminal device may be remodeled so as to provide additional functions to meet the requirement of the new subscriber. Therefore it is impossible to confirm the type and the function of the terminal device just by checking the labels on the outer cover or the appearance thereof. Therefore, the terminal device has heretofore been disassembled so that serviceman may confirm data on the identification, function, license fee and others of the terminal.

However, since the terminal device is usually assembled by special screws and rivets to prevent poaching and for other security reasons, the disassemble operation is extremely complicated, particularly in the case where the microcomputer is disposed in an inner portion of the terminal device.

SUMMARY OF THE INVENTION

An object of the present invention is to provide a terminal device in a CATV system, where data on the type, the function thereof, the license fee and others may be easily checked without disassembling the device so as to facilitate installation, repair and maintenance operations.

According to the present invention, there is provided a terminal device for a CATV system, the terminal device having a microcomputer for controlling operation of the terminal device, comprising a memory for storing data, a keyboard for operating the terminal device, reading means for reading the data stored in the memory by operating the keyboard in accordance with a predetermined operation, and a display for displaying information based on read out data on the terminal device.

In an aspect of the invention, there is also provided a terminal device for a CATV system, the terminal device having a microcomputer for controlling operation of the terminal device, comprising an input/output port of the microcomputer being arranged to be connected to various modules, a keyboard for operating the terminal device, recognizing means for recognizing the kind of a module attached thereto from connecting conditions of the module by operating the keyboard in accordance with a predetermined operation, and a display for displaying information based on the recognized kind of the module.

The other objects and features of this invention will become understood from the following description with reference to the accompanying drawings. BRIEF DESCRIPTION OF DRAWINGS

DETAILED DESCRIPTION OF THE PREFERRED EMBODIMENTS

Figure 1:
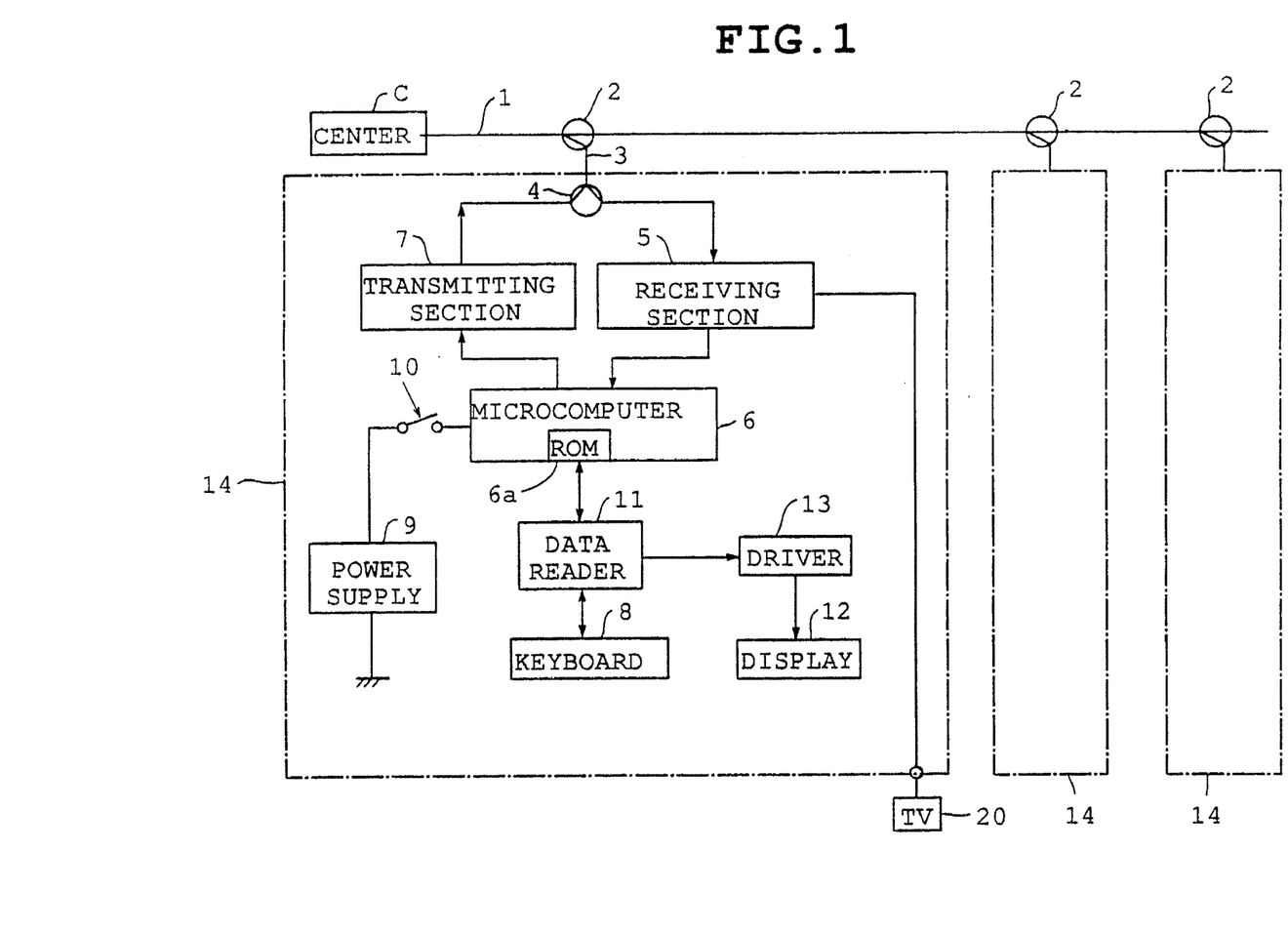
FIG. 1 is a block diagram of a terminal device having a control unit provided in a terminal device according to the present invention, as a first embodiment.

Referring to FIG. 1, showing the first embodiment of the present invention, a terminal device 14 of a CATV system is connected to a center C thereof through a transmission line 1, directional coupler 2 and a branch-line 3. The terminal device 14 comprises a receiving section 5 to which TV signals and a downstream signal including data demand signals and others from the center C are applied through a directional coupler 4. The TV signal is applied from the receiving section 5 to a television receiver 20. The receiving section 5 is connected to a microcomputer 6 which is connected to a power supply 9 through a power switch 10. The microcomputer 6 has a ROM 6a in which programs for controlling the terminal device and various data such as a version data of the microcomputer 6 are stored. The microcomputer 6 analyzes the data demand signal and accordingly feeds the data to a transmitting section 7, which in turn transmits a corresponding data signal to the center C. The microcomputer 6 further detects the voltage supplied from the power supply 9 to determine whether the switch 10 is opened or closed. The power is fed to each component of the terminal device 14 when the switch 10 is closed. A necessary lower limit power is always supplied to circuits necessary for reading and determining the data.

The terminal device 14 is further provided with a data reader 11 which, upon operation of a keyboard 8, reads data stored in the ROM 6a of the microcomputer 6. Information based on the data is fed to a display 12 through a driver 13. The display 12 may be a television of the subscriber.

Figure 2:
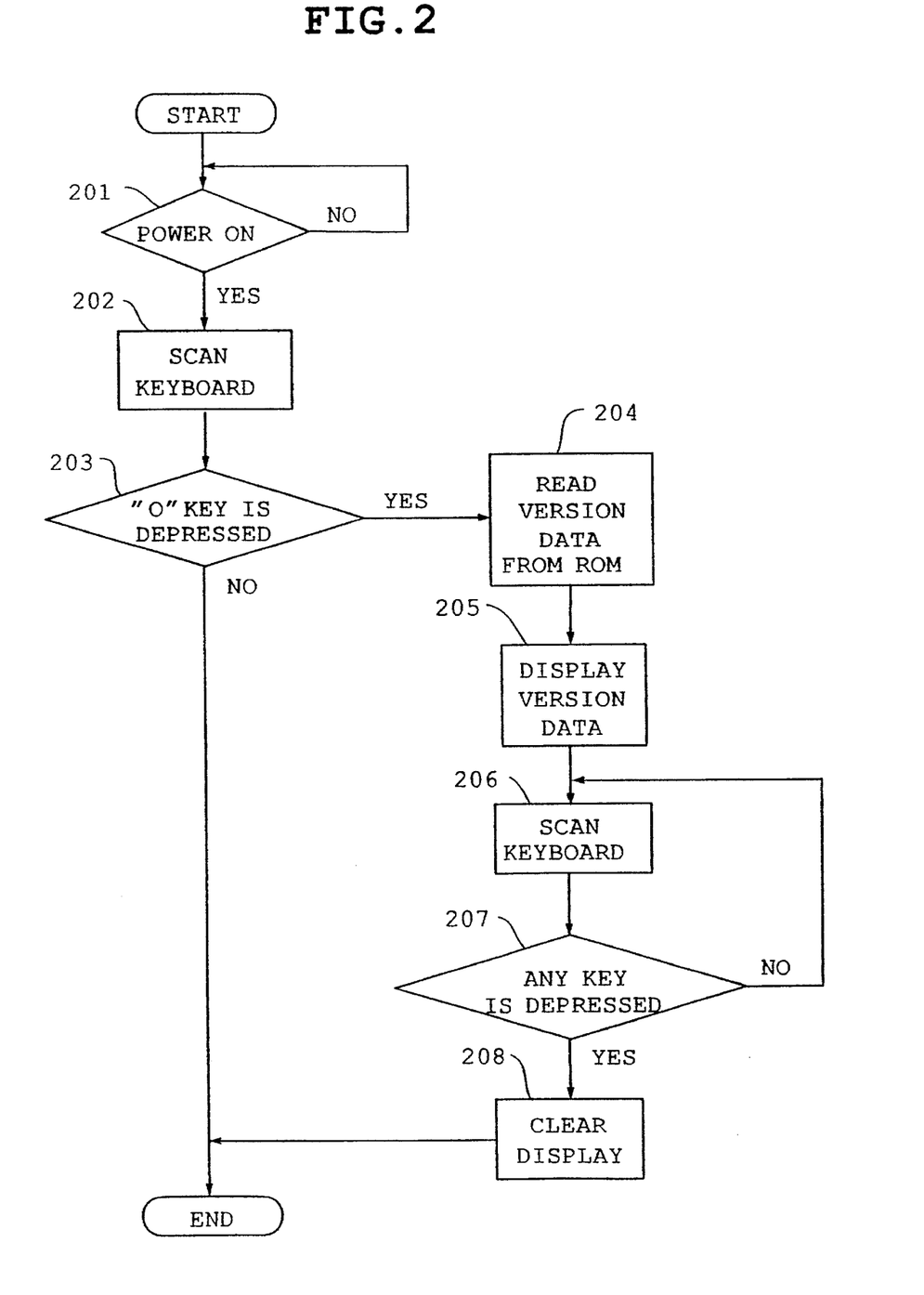
FIG. 2 is a flowchart describing the operation of the control unit shown in FIG. 1.

The operation of the microcomputer 6 of the terminal device 14 for indicating the version of the microcomputer 6 on the display 12 is described hereinafter with reference to FIG. 2.

The program of the present embodiment is effected when an operator depresses a predetermined key, for example, a "0" key of the keyboard 8, under closing the power switch 10. At a step 201 of the program, it is determined that the power switch 10 is turned on, and at a step 202, the keyboard is scanned. If the "0" key, is depressed (step 203), the program proceeds to a step 204 where the data reader 11 reads out the version data of the microcomputer stored in the ROM 6a at a predetermined address. At a step 205, the version data is shown on the display 12 through the driver 13.

At a step 206, the keyboard 8 is again scanned. If any key of the keyboard 8, which may be the "0" key, is depressed, the program goes from a step 207 to a step 208 where the driver 13 clears the display 12. Thereafter, the terminal device 14 performs an ordinary operation for displaying the TV signal of the television.

Thus, upon installation, a serviceman needs only to operate the keyboard 8 and look at the display 12 to check the version of the microcomputer 6 provided in the particular terminal device. Hence the terminal device need not be disassembled to directly inspect the package of the microcomputer 6 nor test it with an exclusive instrument.

The present embodiment may be modified to display other data which are useful at installation, repair, and maintenance of the device, such as data on change of the design of the circuit.

Figure 3:
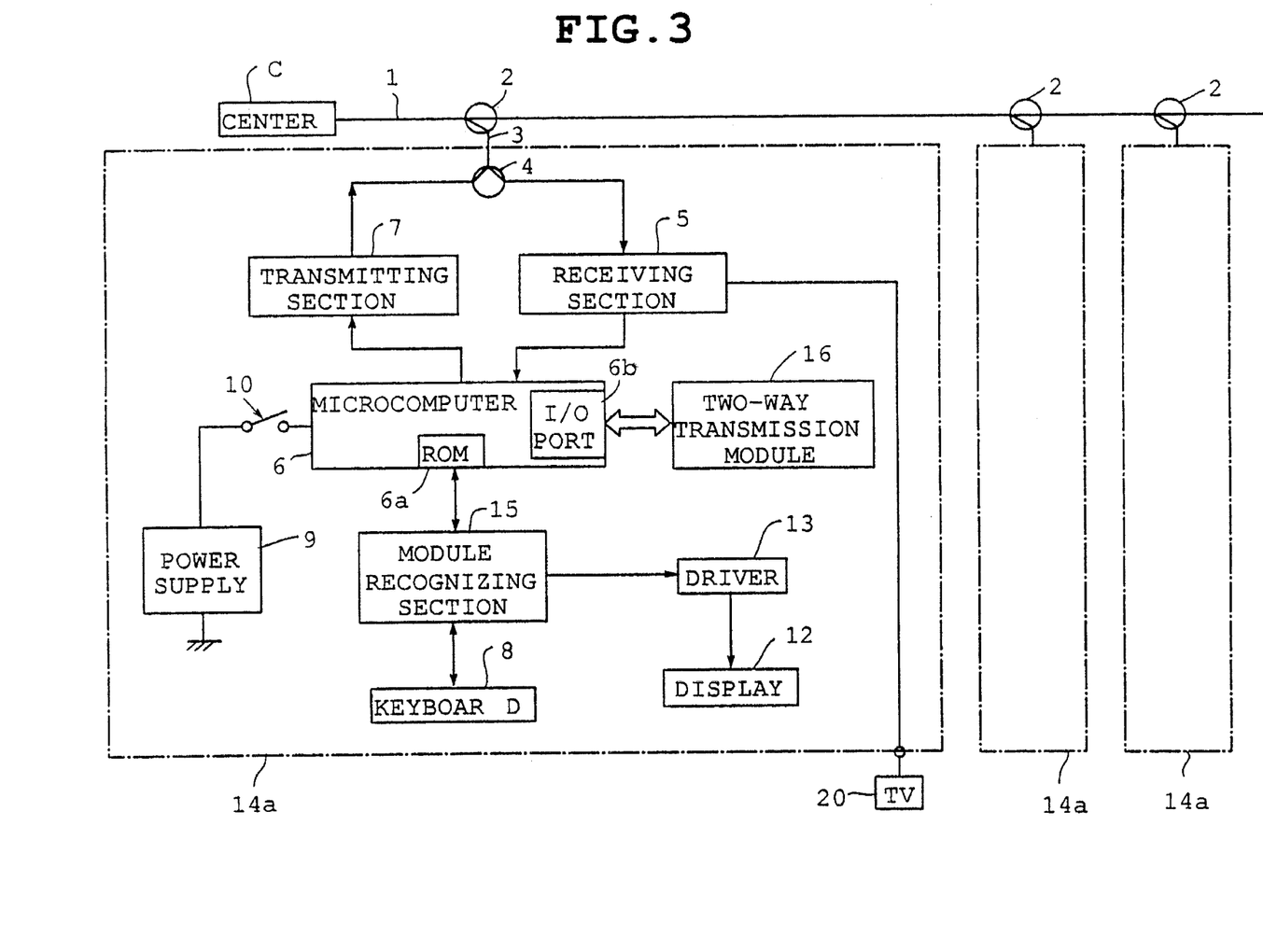
FIG. 3 is a block diagram of a terminal device having a control unit provided in a terminal device of a second embodiment.

FIG. 3 shows a terminal device 14a of the second embodiment of the present invention having a module for two-way transmission. The same parts as the first embodiment are identified with the same reference numerals as FIG. 1 and hence, the description thereof are omitted.

Figure 4:
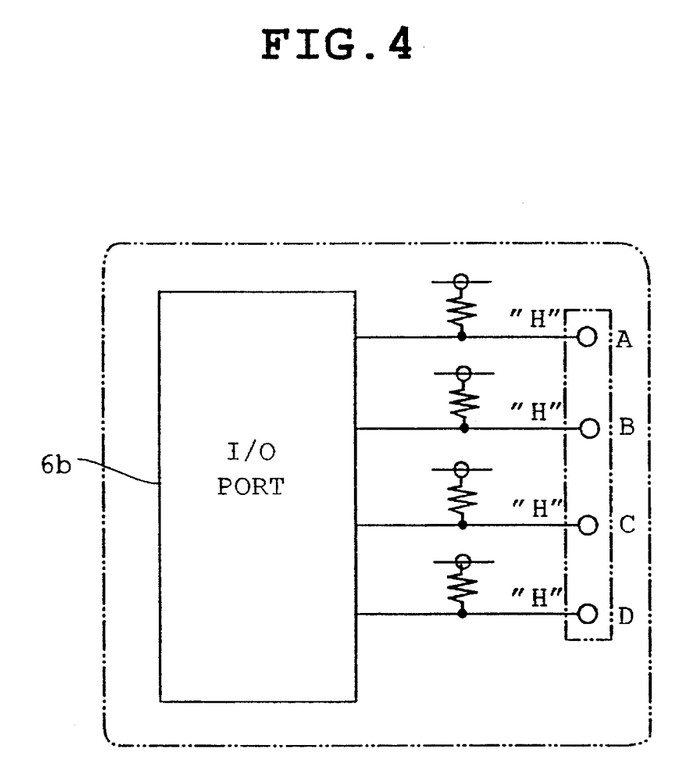
FIG. 4 is a schematic illustration of an input/output port provided in the control unit shown in FIG. 3.
Figure 5A:
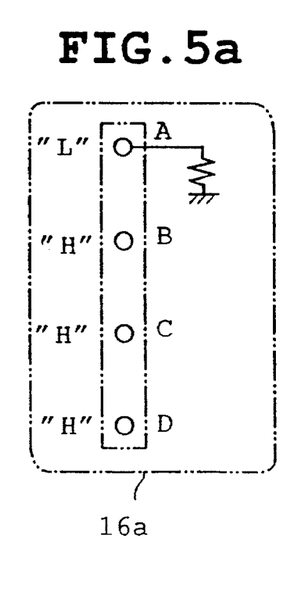
FIG. 5a and 5b show connecting conditions of terminals of different modules.
Figure 5B:
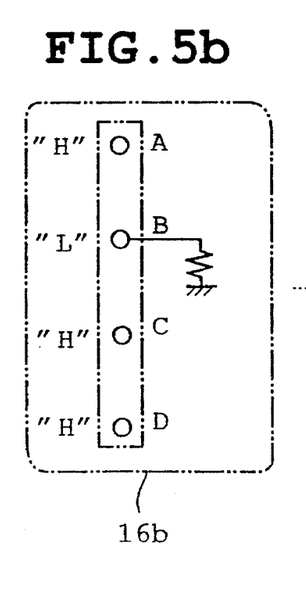

A module 16 for transmitting data at polling is connected to an input/output (I/O) port 6b provided in the microcomputer 6. As shown in FIG. 4, the I/O port 6b has a plurality of input and output terminals, for example, four terminals A, B, C and D, which are adapted to be connected to various types of modules. Each terminal is applied with a high level voltage which turns into a low level voltage if the terminal is connected with a terminal of the module 16. More particularly, a terminal of an A-type module 16a is connected to the terminal A as shown in FIG. 5a. Consequently, the voltage at the terminal A becomes a low level voltage. Accordingly, the voltage levels of the terminals A, B, C and D are expressed as "0,1,1,1". On the other hand, a terminal of a B-type module 16b is connected to the terminal B as shown in FIG. 5b. The voltage levels are expressed as "1,0,1,1". Thus, the type of the module can be detected by the arrangement of the voltage levels. Resistors shown in FIGS. 4, 5a and 5b show resistances equivalent to that at the terminal of modules 16.

A module recognizing section 15 determines whether the installed module 16 is A-type, B-type or other type, depending on the detected voltage level. The recognizing section 15 is connected to the driver 13 to indicate the module type on the display 12.

Figure 6:
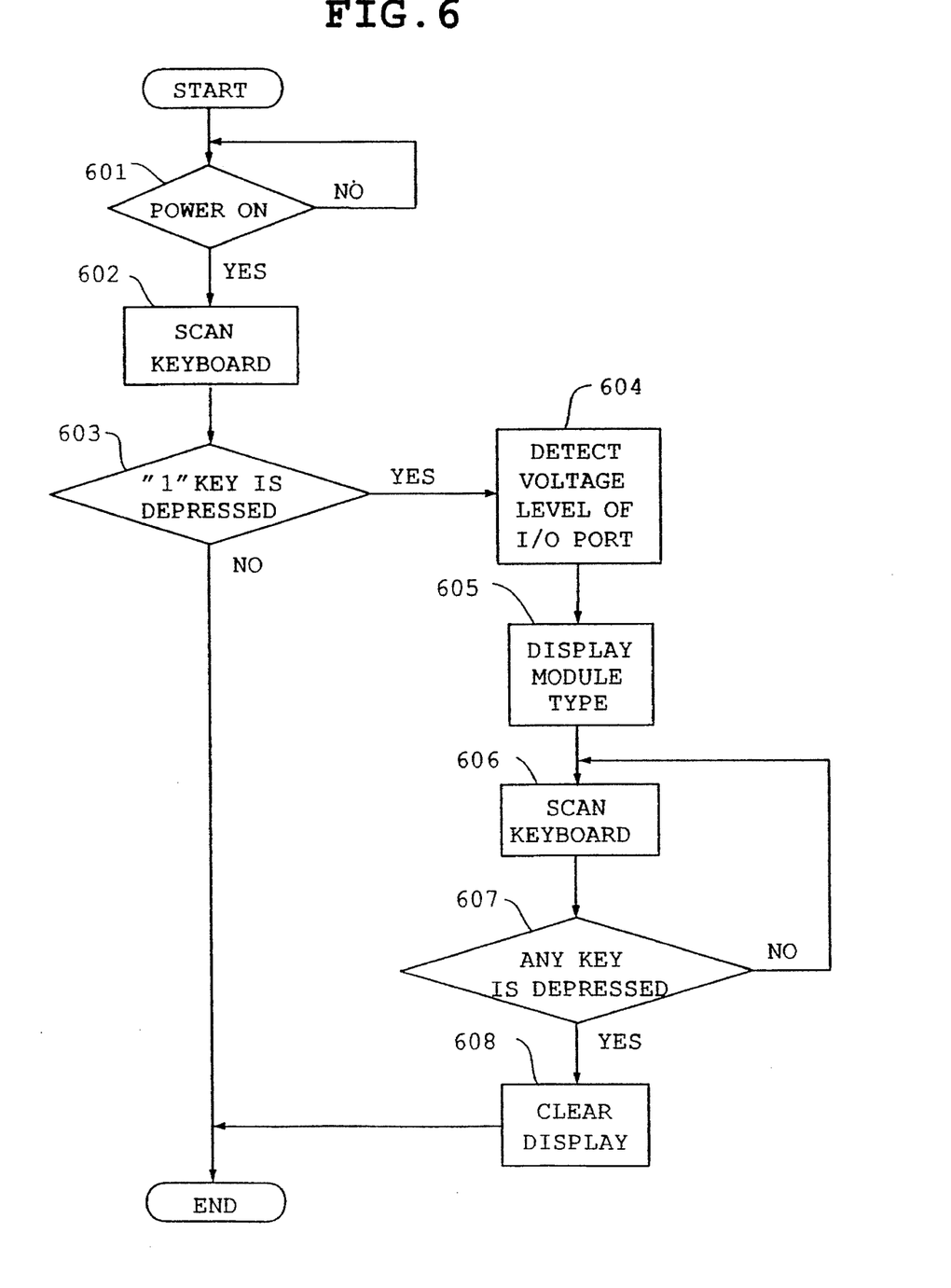
FIG. 6 is a flowchart describing the operation of the control unit of the second embodiment.

FIG. 6 shows the operation of the present embodiment for checking the type of the module mounted in the terminal device 14a. The program is started by depressing a predetermined key such as a "1" key of the keyboard 8 at turning on the power switch 10. When the microcomputer 6 determines that the power switch 10 is closed at a step 601, the keyboard 8 is scanned at a step 602. If it is determined at a step 603 that the "1" key is depressed, all of the terminals of the I/O port 6b are changed to input terminals so as to detect the voltage level of each terminal (step 604). If the voltage levels of the terminals is expressed "0,1,1,1", the module recognizing section 15 determines that the A-type module 16a is mounted. Thereafter, the display 12 indicates the module type at a step 605.

When the voltage level of the terminals of the I/O port 6b is expressed "1,0,1,1", the module recognizing section 15 determines that the module is the B-type module 16b, which has a function different from that of the A-type module. The module type is shown on the display 12 at the step 605. If the voltage levels detected at the step 604 show "1,1,1,1", the module recognizing section 15 determines that none of the modules fitted for the I/O port 6b is connected to the terminals A, B, C and D. The result is also indicated on the display 12.

Thereafter, the keyboard 8 is again scanned at a step 606. When it is determined at a step 607 that any key has been dispressed, the display 12 is cleared at a step 608.

In accordance with the terminal device 14a of the present embodiment, the type of the module provided therein is easily checked without disassembling the terminal device nor checking each function items of the module 16.

Other modules such as a sound multiplex module may be provided in place of the two-way transmission module. Furthermore, two or more modules may be connected to the microcomputer 6, in which case a plurality of I/O ports are provided. Although the type of the modules is identified in accordance with the difference in impedance of the circuit of the module and disposition of the output terminals thereof in the present embodiment, a specific identification element may be provided in the module.

Figure 7:
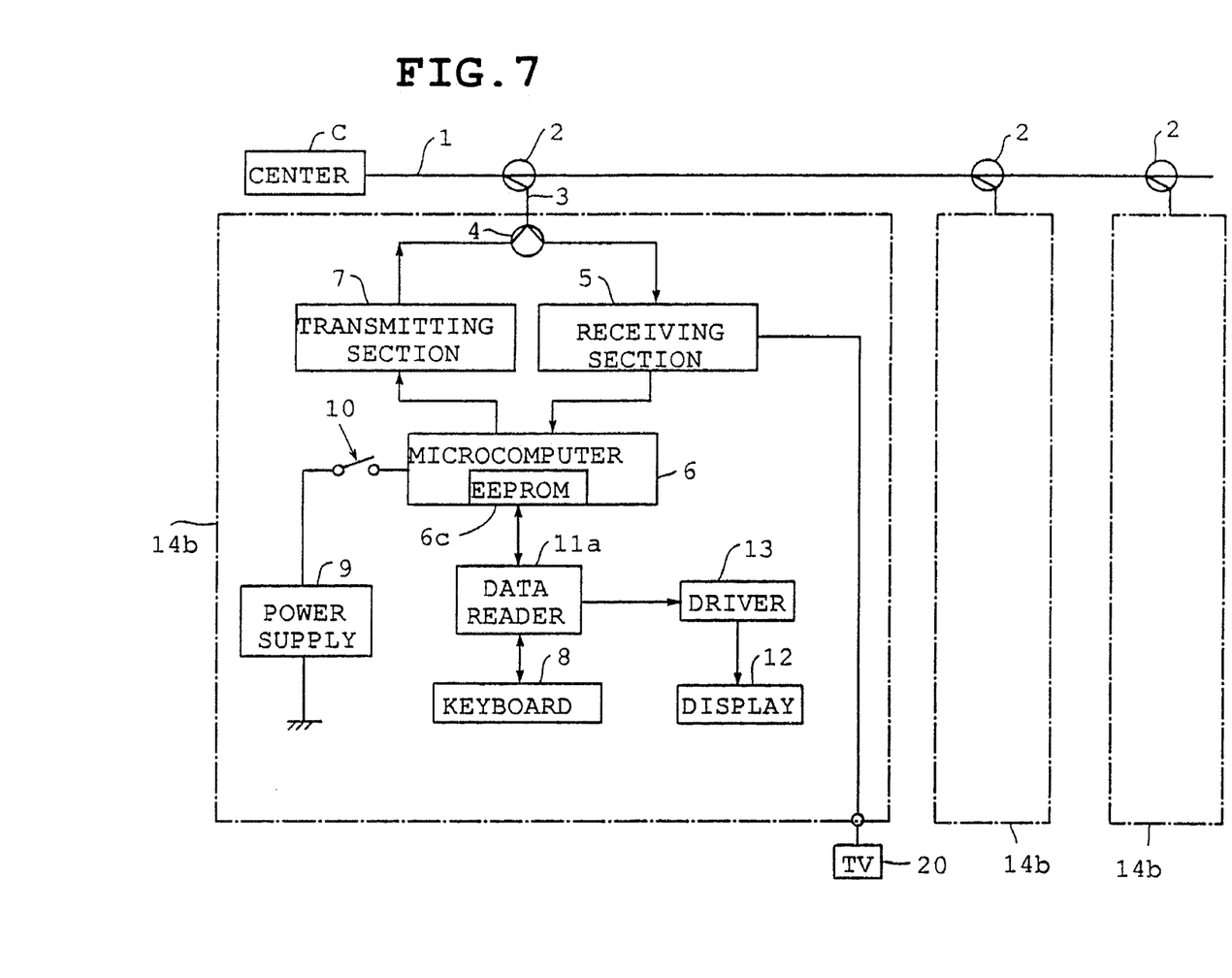
FIG. 7 is a block diagram of a terminal device having a control unit provided in a terminal device of a third embodiment.

Referring to FIG. 7, in a terminal device 14b of the third embodiment, the receiving section 5 receives a downstream signal modulated, for example FSK modulation for the polling. The receiving section 5 determines the receiving condition of the FSK signal, for example, by a parity check. The microcomputer 6 of the present embodiment has an EEPROM 6c wherein data on the receiving condition and accounting data on the license fee are stored. A data reader 11a reads the data from the EEPROM 6c to indicate the data on the display 12.

Figure 8:
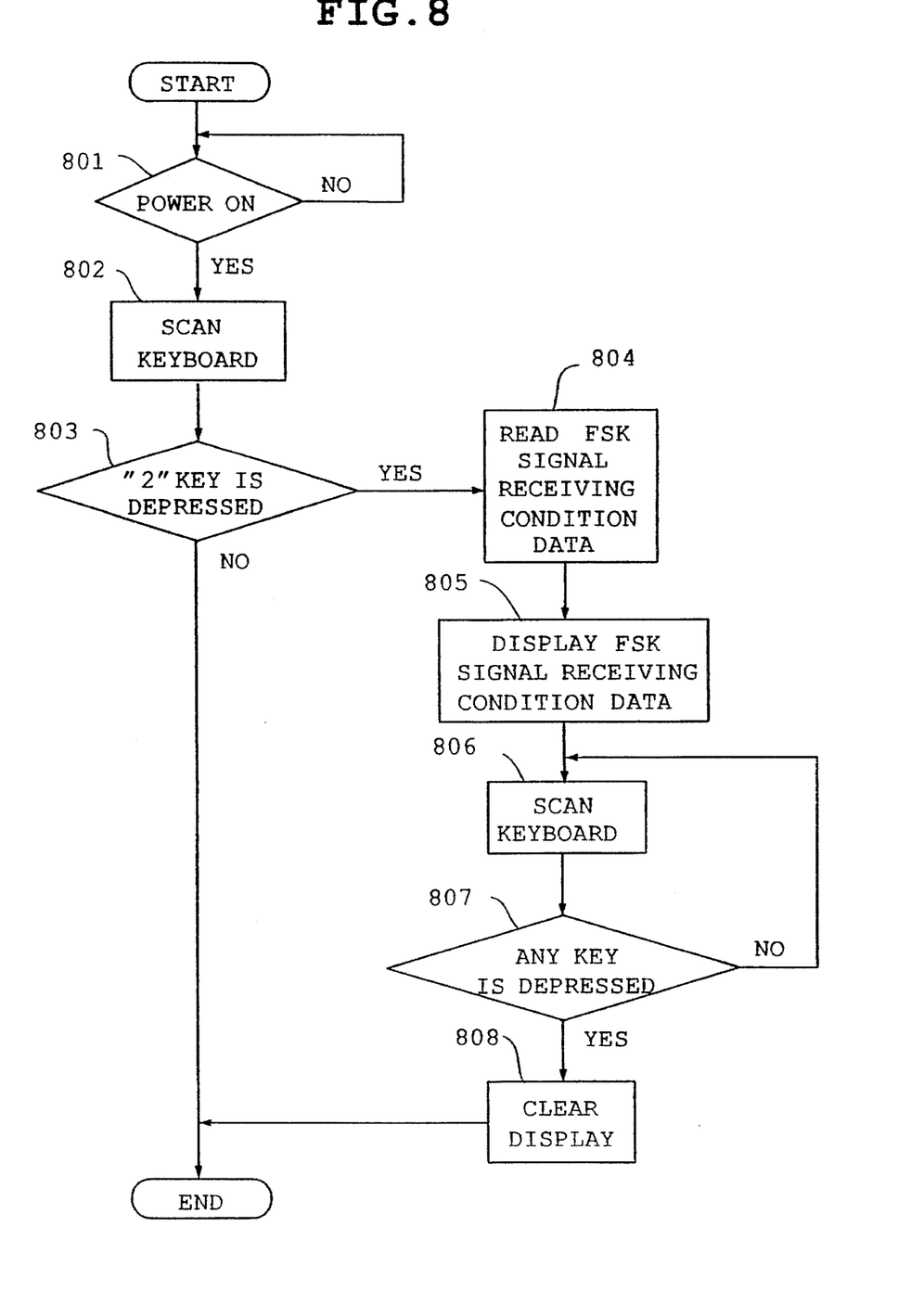
FIG. 8 is a flowchart describing the operation of the control unit of the third embodiment.

The operation of the control unit 14b is described hereinafter with reference to FIGS. 8 and 9. In order to check the receiving condition of the FSK signal, depression of a "2" key of the keyboard 8 is required at turning on the power switch 10 in the operation of FIG. 8. Therefore, it is determined that the power is turned on at a step 801 and thereafter, the keyboard 8 is scanned at a step 802. When the "2" key is depressed (step 803), the data reader 11a reads a data on the receiving condition of the FSK signal from the EEPROM 6c of the microcomputer 6 at a step 804. The data is applied to the display 12 through the driver 13 to display the receiving condition.

The keyboard 8 is scanned at a step 806. When a step 807 determines that any key is depressed, the program goes to a step 808 where the driver 13 clears the display 12.

Figure 9:
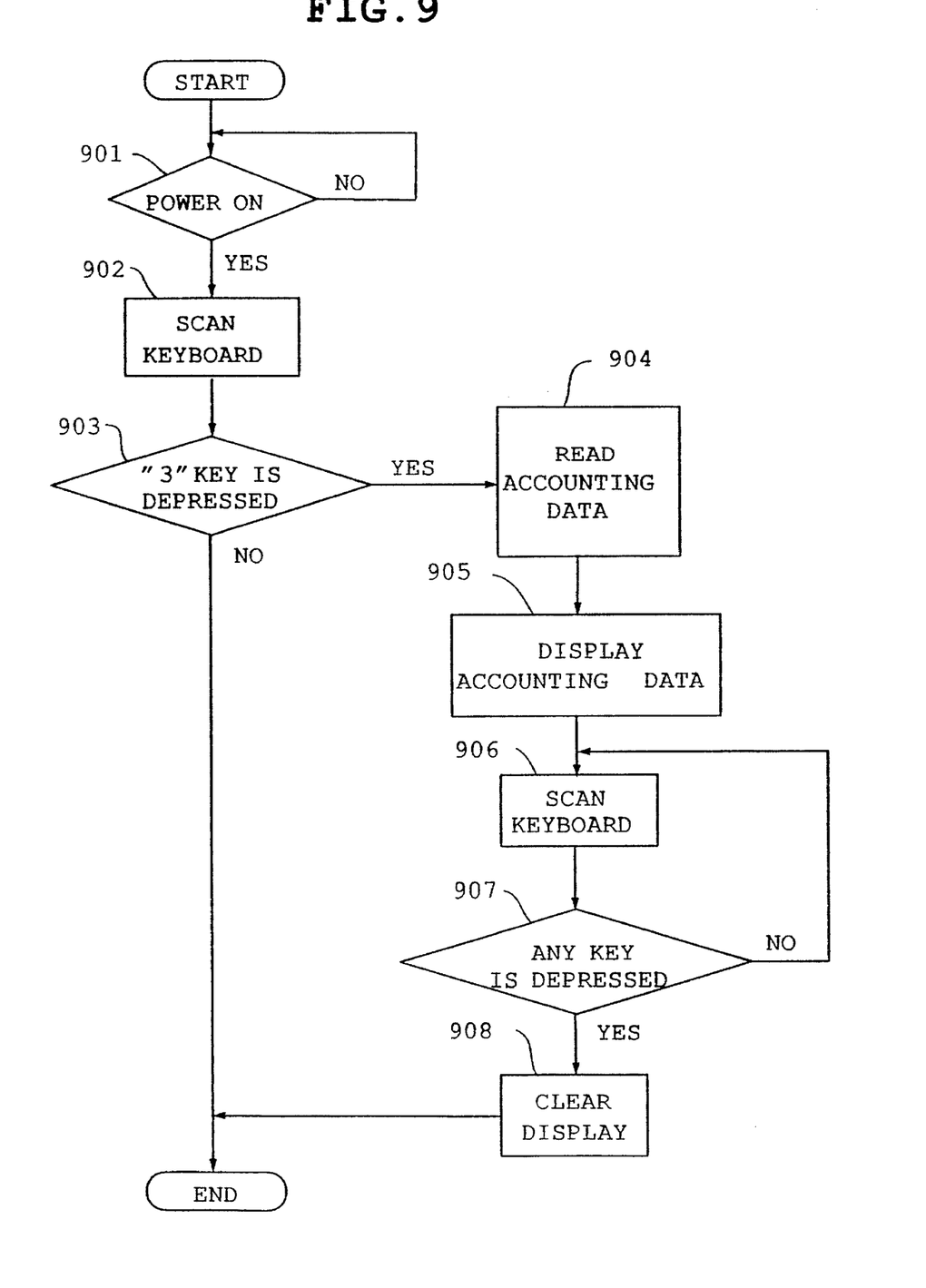
FIG. 9 is a flowchart describing another operation of the control unit of the third embodiment.

In order to confirm the accounting data on the license fee stored in the EEPROM 6c, a "3" key is depressed at the closing of the switch 10 to start the program shown in FIG. 9. Accordingly, it is determined whether the power is turned on and the "3" key is depressed (steps 901 to 903). When the answer is YES, the program goes to a step 904 where the data reader 11a reads the accounting data on the license fee stored in the EEPROM 6c. The data is displayed on the display 12 at a step 905. Thereafter, the display 12 is cleared if any key is depressed (steps 906 to 908).

Although the FSK signal receiving condition data is stored in the EEPROM in the hereinbefore described embodiment, the terminal device may be modified to indicate by a lamp which is intermittently turned on in accordance with the digital data of the FSK signal so that the receiving condition of the FSK signal can be indicated without using a memory.

The display 12 in each of the embodiments may be substituted by a plurality of light emitting devices such as LEDs so as to indicate information by various lighting patterns thereof. Alternatively, an indicator which is fundamentally provided in the terminal device for indicating the channel and the operational mode may be used. Furthermore, data may also be displayed on a television of the subscriber as an image.

The program of each embodiment may be started when a predetermined plurality of keys are simultaneously depressed instead of when a certain key is depressed as described in the previously described embodiments.

Although each of the described embodiments are adapted to clear the display when any key is depressed, a timer may be provided in the terminal device so that the display is automatically cleared after a predetermined period of time. Alternatively, the power switch may be turned off and on again to clear the display.

Although the components of the terminal device start to operate by closing the switch 10, other means may be employed. For example, a detector device for detecting the rising of the power supplied to at least one of the components may be provided instead of the switch, and the operation of the keyboard is performed with a delay sufficient for energizing the components.

From the foregoing, it will be understood that the present invention provides a terminal device where serviceman needs only to operate the keyboard to confirm various data on the terminal device necessary for installing, maintenance and repair of the device, through the display. Therefore, it is not necessary to disassemble the terminal device and to operate the device in accordance with predetermined checking items for confirming the function of the device.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A terminal device for a CATV system, said terminal device having a microcomputer for controlling operation of said terminal device, said terminal device comprising:
   an input/output port of said microcomputer being selectively connected to various kinds of modules;
   a keyboard for operating said terminal device;
   recognizing means for recognizing which kind of module is connected to said input/output port from connecting conditions of said module by operating said keyboard in accordance with a predetermined operation; and
   a display for displaying information based on the recognized kind of module wherein said input/output port serves as an input terminal for detecting an impedance or voltage in accordance with said predetermined operation of the keyboard.

2. A terminal device according to claim 1 further comprising detector means for detecting rising of power supplied to at least one of the components of said terminal device, and said predetermined operation of said keyboard becoming effective under a predetermined time condition dependent on said rising of power.

3. A terminal device according to claim 1 wherein said predetermined operation of said keyboard becomes effective by simultaneously operating plural keys.

4. A terminal device according to claim 1 wherein said information is displayed on a television connected to said terminal device.

5. A terminal device according to claim 2 wherein said terminal device performs a normal operation of displaying a TV signal after a predetermined time of displaying said information.

6. A terminal device according to claim 2 wherein said predetermined time condition is that said keyboard is operated at said rising of power.

7. A method of displaying data on a terminal device for a CATV system, said terminal device having a control device including a microcomputer for controlling operation of said terminal device, an input/output port of said microcomputer arranged to be selectively connected to various kinds of modules, a keyboard for operating said terminal device, recognizing means, and a display for displaying information relative to said terminal device, the method comprising the steps of:
   recognizing which kind of module is connected to the port from impedance or voltage at said input/output port of said microcomputer by operating said keyboard in accordance with a predetermined operation; and
   displaying information based on recognized kind of module, on said display.

* * * * *